US006533252B1

(12) United States Patent
Bernard et al.

(10) Patent No.: US 6,533,252 B1
(45) Date of Patent: Mar. 18, 2003

(54) METHOD FOR REGULATED INJECTION OF LIQUID CARBON DIOXIDE IN A PRESSURED LIQUID

(75) Inventors: Frédéric Bernard, Boulogne Billancourt (FR); Dominique Bras, Tremblay en France (FR); Jose Buil, Fresnes (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/869,419
(22) PCT Filed: Nov. 29, 1999
(86) PCT No.: PCT/FR99/02946
§ 371 (c)(1),
(2), (4) Date: Sep. 10, 2001
(87) PCT Pub. No.: WO00/38825
PCT Pub. Date: Jul. 6, 2000

(30) Foreign Application Priority Data

Dec. 29, 1998 (FR) .......................................... 98 16534

(51) Int. Cl.⁷ .................................................. B01F 3/04
(52) U.S. Cl. ...................... 261/18.1; 261/39.1; 261/59; 261/76; 261/DIG. 7
(58) Field of Search .................... 261/18.1, 37, 39.1, 261/53, 59, 61, 76, 77, DIG. 7, DIG. 39

(56) References Cited

U.S. PATENT DOCUMENTS

| 2,699,731 A | * | 1/1955 | Pollock et al. ............. 261/18.1 |
| 2,916,268 A | * | 12/1959 | Pedrick ..................... 261/18.1 |
| 3,716,346 A | | 2/1973 | Greene |
| 3,732,668 A | * | 5/1973 | Nichols ....................... 261/77 |
| 4,986,296 A | | 1/1991 | Jones et al. |

FOREIGN PATENT DOCUMENTS

| CH | 365708 | * | 1/1963 | ................ 261/18.1 |
| DE | 3212777 | * | 10/1983 | ................ 261/59 |
| EP | 0075804 A2 | | 9/1982 | |
| EP | 0376823 A1 | | 12/1989 | |
| EP | 0421597 A1 | | 8/1990 | |
| EP | 0656316 A1 | | 11/1994 | |
| FR | 2598095 A1 | | 4/1987 | |
| RU | 2013633 C1 | * | 5/1994 | ................ 261/18.1 |
| WO | 91/02964 | | 3/1991 | |

OTHER PUBLICATIONS

Search Report issued in Application No. PCT/FR99/02946.

* cited by examiner

Primary Examiner—C. Scott Bushey
(74) Attorney, Agent, or Firm—Burns, Doane, Swecker & Mathis, L.L.P.

(57) ABSTRACT

Method and its associated device for the regulated injection of liquid carbon dioxide ($CO_{2_L}$) into a liquid (L) under pressure inside a chamber. The liquid carbon dioxide ($CO_{2_L}$) is, according to this method, injected at a fixed flow rate, in stepped mode, under the protection of a stream of gas (when injection is stopped).

19 Claims, 1 Drawing Sheet

METHOD FOR REGULATED INJECTION OF LIQUID CARBON DIOXIDE IN A PRESSURED LIQUID

BACKGROUND OF THE INVENTION

1. Field of the Invention

Figure 1:
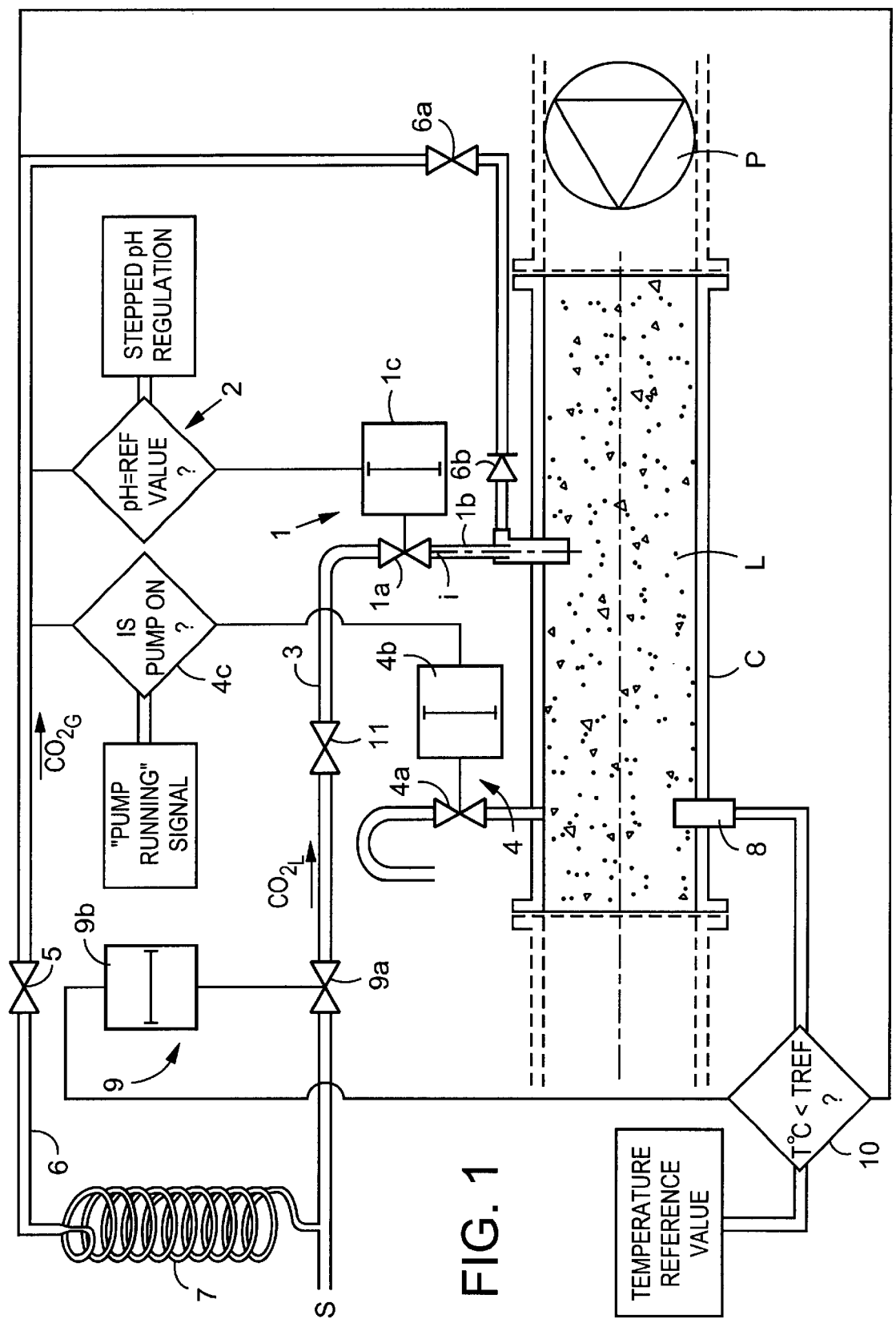

The subject of the present invention is a method and a device for the regulated injection of liquid carbon dioxide ($CO_{2_L}$) into a liquid under pressure. The regulation of the injection of the $CO_{2_L}$ is, according to the invention, set at a fixed flow rate, in stepped mode.

The method and device of the invention are quite particularly suitable for injecting $CO_{2_L}$ into a liquid circulating under pressure through a pipe. The context of the present invention is that of the treatment with carbon dioxide ($CO_2$) of any type of pressurized liquid, particularly liquids consisting of reaction mediums, industrial effluent, drinking water, etc. In the context of the said present invention, the Applicant proposes an optimized technique for the injection of liquid carbon dioxide ($CO_{2_L}$), this being optimized particularly both from the point of view of protection from the liquid into which the said $CO_{2_L}$ is injected and from the point of view of environmental protection.

2. Description of the Related Art

In general, the injection of gaseous carbon dioxide ($CO_{2_G}$) is a technique that has been fully mastered. However, implementation of the said technique assumes prior vaporization of the carbon dioxide stored in the liquid state:

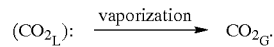

Such prior vaporization presupposes that the user site comprises a vaporizer and entails a not insignificant power consumption. To be able to avoid such prior vaporization is obviously economically very attractive, both as regards saving on investment (absence of a vaporizer) and in terms of savings on running costs (absence of power consumption).

The—direct—injection of $CO_{2_L}$, while being of undisputed economical benefit, does, however, prove to be a technique which is more difficult to implement. Those skilled in the art are not unaware of this fact.

The Applicant has already proposed a technique for the—direct—injection of $CO_{2_L}$. This technique is described in Patent Application FR-A-2,641,854. It is relatively complicated and its implementation requires substantial investment. Its implementation is in fact generally only justified in large installations if significant amounts of $CO_{2_L}$ are to be injected. The said technique involves, for injecting a variable flow rate of $CO_{2_L}$ (permanent and non-stepwise regulated flow of $CO_{2_L}$), the injection being regulated in proportional mode:

a controlled valve, of the proportional type (with variable flow rate) with no injector;

an upstream-pressure regulator for delivering the $CO_{2_L}$; and is necessarily implemented with a $CO_2$ pressure, between the said variable-flow rate valve and the said upstream-pressure regulator, which is higher than the triple point pressure of $CO_2$ (a pressure higher than 5.2 bar).

SUMMARY OF THE INVENTION

The Applicant has wished to develop another technique for the regulated injection of $CO_{2_L}$ into a liquid under pressure, which technique would, in particular, be easier to implement. It now proposes such an alternative technique which is particularly well-suited (but not strictly limited) to contexts in which the large investment needed to implement the technique according to FR-A-2,641,854 is not economically viable. According to the said other technique now claimed, the $CO_{2_L}$ is injected at a fixed flow rate, in stepped mode (all or nothing). The injection is regulated, according to the invention, in a different way than in FR-A-2,641,854. It may, in absolute terms, be considered as having poorer performance.

When implementing this type of injection of $CO_{2_L}$, the injection being regulated to occur in stepped mode, it is necessary, each time the injection of $CO_{2_L}$ stops, to be able to avoid:

any running of the pressurized liquid treated with the said $CO_{2_L}$ back into the device used for injecting the said $CO_{2_L}$ (this is liable to lead to the blocking of the injector with, for example, solid residues contained in the said liquid); and any formation of plugs of dry ice, particularly at the location of the said device for injecting the said $CO_{2_L}$ (cold).

Faced with this technical problem which is inherent to the stepwise regulated injection of $CO_{2_L}$ into a pressurized liquid, the Applicant recommends, each time the injection of the said $CO_{2_L}$ stops, the intervention of a gas. The said gas has the dual function of driving back the pressurized treated liquid and of protecting (insulating) the injection device (which thus remains operational) from the said treated liquid which is liable to freeze in situ.

BRIEF DESCRIPTION OF THE FIGURE OF THE DRAWING

The FIGURE of the Drawing illustrates a device for carrying out one embodiment of the method of the present invention.

DETAILED DESCRIPTION OF THE PREFERRED EMBODIMENTS

According to its first subject, the invention therefore relates to an original method for the regulated injection of liquid carbon dioxide ($CO_{2_L}$) into a liquid under pressure and more specifically to a method for the regulated injection, at a fixed flow rate, in stepped mode, of $CO_{2_L}$ into a liquid under pressure implemented under the protection of a stream of gas (when the said injection of $CO_{2_L}$ is stopped).

According to the said original method of the invention, the said $CO_{2_L}$ is injected into the liquid under pressure inside a chamber under the following conditions:

it is injected at a fixed flow rate, in stepped mode, by an injection device comprising an injection valve and an injection head tapped into a wall of the said chamber; the said injection head being positioned directly at the outlet from the said injection valve;

as soon as its injection stops each time, a gas is substituted for it: as soon as each injection of liquid carbon dioxide ($CO_{2_L}$) stops, a gas is delivered into the said liquid through the said injection head in place of the said liquid carbon dioxide ($CO_{2_L}$); the said gas being delivered at sufficient pressure to prevent any of the said liquid from running back into the said injection head.

The injection of $CO_{2_L}$ according to the method of the invention is true injection, direct injection into the liquid which is to be treated, through a wall of the chamber containing the said pressurized liquid. To implement it, the said injection involves an appropriate injection device which comprises an injection valve and an injection head. The said injection valve comprises a valve, for example of the ball valve type, associated with an injector. The said injector is more or less integrated into the structure of the said valve. For good injection, the person skilled in the art will readily understand firstly that the injector must not be truly separate from the valve and secondly that the injection head has to be positioned directly at the outlet from the injection valve.

The regulated injection according to the invention is, as already mentioned, of the type of injection with a preset fixed flow rate, in stepped mode. The injection valve is an all or nothing valve.

As soon as the said valve is closed, and $CO_{2_L}$ is no longer being injected, the gas characteristically comes into action. It intervenes, at the injection head (downstream of the injection valve) in place of the said $CO_{2_L}$, to be delivered into the liquid under pressure. It will be readily understood that, according to an advantageous alternative form, the said injection head has at least two inlets:

one for the $CO_{2_L}$, one for the protective gas; and one outlet for delivering, alternately, the said $CO_{2_L}$ and the said protective gas, into the pressurized liquid.

In order to play its part as a gas that protects the injection device from the pressurized liquid, the said gas is obviously used at sufficient pressure.

The said protective gas (providing, in particular, thermal protection from the $CO_{2_L}$ injected at about –80° C.) which is characteristically involved in the implementation, according to the invention, of the injection of $C_{2_L}$ in stepped mode into a liquid under pressure may, in particular, consist of a gas which is "inert" with respect to the said liquid, "compatible" with the said liquid and not likely to adversely affect it, or to react chemically with it (we are talking here about at least relative inertness). It may, in particular, be a gas which is inert not in the chemical meaning of the term (this then is absolute inertness), and be an inert gas which is nitrogen ($N_2$).

The scope of the invention does not, however, in any way include the use, by way of protective gas, of another type of gas, a gas which is not inert. Thus, according to a particularly preferred alternative form, the said protective gas is not an inert gas but consists of carbon dioxide: $CO_{2_G}$. In this alternative form, the liquid under pressure therefore receives $CO_{2_L}$ and $CO_{2_G}$ alternately. The said $CO_{2_G}$ may come from any suitable source. Advantageously it comes from vaporizing a fraction of the $CO_{2_L}$ tapped from the $CO_{2_L}$ supply circuit of the injection device upstream of the said injection device. Just one $CO_{2_L}$ supply source is therefore needed to implement this advantageous alternative form of the method of the invention. Conscious use of some other non-inert gas may also be envisaged; the said gas then, in addition to its primary function of acting as a protective gas, fulfilling at least one other function.

Whatever the nature of the gas delivered into the liquid under pressure when the injection of $CO_{2_L}$ stops—inert gas, $CO_{2_G}$, other gas—it may be sensible to remove the said gas, at least partially, from the aid liquid. Such removal cannot be harmful, if performed carefully, insofar as the said gas, simply by being delivered into the liquid, has fulfilled its function of safeguarding the injection of $CO_{2_L}$. By contrast, in certain contexts, it may prove to be highly beneficial or even practically compulsory. It is possible, in particular, thus to prevent the creation of resulting layers or pockets of gas in the chamber containing the liquid under pressure.

If the said chamber consists of a pipe through which the said liquid under pressure flows, under the action of a pump, the person skilled in the art will readily understand that such pockets of gas are likely to cause the said pump to loose its prime. To constantly maintain a liquid charge downstream of the said pump it is therefore strongly recommended, when implementing the method of the invention, that the gas delivered into the liquid be removed opportunely (when the said pump is stopped).

In general, the protective gas delivered when the injection of $CO_{2_L}$ is stopped, is therefore advantageously at least partially removed. The gas thus recovered may advantageously be recycled (by way of protective gas).

According to the method of the invention, the injection of $CO_{2_L}$:

at a fixed flow rate, in stepped mode, under the protection of a stream of gas, is generally implemented in the following conditions: the $CO_{2_L}$ is injected at an upstream pressure of between about $14 \cdot 10^5$ and $20 \cdot 10^5$ Pa (14 and 20 bar) and at an upstream temperature of between –20° C. and –30° C.

Advantageously, for obvious safety reasons, the said injection of $CO_{2_L}$ is carried out with control of the temperature of the liquid into which the said $CO_{2_L}$ is injected; the injection of the said $CO_{2_L}$ being stopped as soon as the temperature of the liquid is below a reference temperature. This is because it is necessary to be able, at any moment, to avoid the consequences of an abnormal length of $CO_{2_L}$ injection period (particularly inherent in equipment failure; failure of the injection valve for example), so that at any moment to avoid a dangerous drop in the temperature of the liquid which may lead to the icing-up (with dry ice) of the chamber containing the said liquid.

The method according to the invention, as described hereinabove in general terms and as described hereinbelow more specifically with reference to the single appended figure, can be implemented in various contexts. As already mentioned, it is particularly well-suited to the regulated injection, in stepped mode, of $CO_{2_L}$ into a liquid circulating under pressure through a pipe. Such a liquid may circulate at pressures up to 8–10 bar. It generally circulates at pressures from 4–5 bar. In any event, the Applicant has been able to verify the feasibility and advantages of its new reliable method for injecting $CO_{2_L}$ into liquids circulating at such pressures.

According to the invention, the liquids "treated with $CO_{2_L}$" may consist of any sort of liquid: in particular, these may be reaction mediums, industrial effluent, drinking water, etc.

They may be treated with $CO_{2_L}$ for various purposes, particularly for descaling purposes and/or for the purpose of preventing the build-up of scale in the devices containing them or through which they circulate.

The method of the invention is also quite particularly well-suited to lowering and advantageously controlling the pH of industrial effluent, before disposing of it down the drain. In this context, the injection of $CO_{2_L}$ is advantageously directly slaved to the measuring of the pH.

The second subject of the present invention, mainly a device for the regulated injection of liquid carbon dioxide ($CO_{2_L}$) into a liquid under pressure inside a chamber, the device being suited to the implementation of the method that was the first subject of the said present invention, will now be described, in general terms.

The said device comprises:

an injection valve and an injection head tapped into a wall of the said chamber, the said injection head being positioned directly at the outlet of the said injection valve; the said injection valve 1a being connected by a supply circuit to a suitable source S of liquid carbon dioxide ($CO_{2_L}$) and being suitable for injection at a fixed flow rate in stepped mode; and means for supplying the said injection head with a gas.

It in fact comprises suitable means for implementing an injection of $CO_{2_L}$ at a fixed flow rate in stepped mode; the means being arranged to allow the protective gas to be delivered each time the said injection of $CO_{2_L}$ stops. The said suitable means comprise the injection valve—valve+injector or valve incorporating the said injector—and an injection head. In original manner, the said injection head according to the invention can be supplied with $CO_{2_L}$ and with gas alternately for delivering the said $CO_{2_L}$ and the said gas into the liquid under pressure. Advantageously, as already mentioned, the said injection head has at least two inlets and one outlet. Particularly advantageously it has, facing the injector, a first inlet for the $CO_{2_L}$, facing the said first inlet a (direct) outlet into the liquid and, arranged at 90° from its axis connecting the said first inlet and the said outlet, a second inlet for the gas.

The injection head of the injection device according to the invention is therefore connected firstly to a suitable source of $CO_{2_L}$ and secondly to a suitable source of protective gas. Insofar as it has been seen that the said protective gas may consist of $CO_{2_G}$ and advantageously that the said $CO_{2_G}$ comes from vaporizing a fraction of the $CO_{2_L}$ tapped from the $CO_{2_L}$ supply circuit supplying the injection valve, it will be understood that according to an advantageous alternative form, the injection device comprises, arranged on the said $CO_{2_L}$ supply circuit, upstream of the injection valve, means for tapping and vaporizing a fraction of the said $CO_{2_L}$; the said tapping and vaporizing means being connected to the means for supplying the injection head with gas. The safeguarded $CO_{2_L}$ injection device according to the invention can therefore operate connected to just one source of $CO_{2_L}$.

The said device comprises the essential means specified hereinabove, obviously associated with appropriate control means. The said essential means are also advantageously associated with:

means for removing the gas delivered into the liquid and, according to a particularly advantageous alternative form, means for recycling the said recovered removed gas. In the particular context where the injection head of the injection device according to the invention is tapped into the wall of a pipe inside which the liquid circulates under pressure under the action of means (such as pumps) for circulating under pressure the said liquid, the said means for removing the gas delivered into the said pipe are obviously arranged downstream of the said injection head and are advantageously slaved to the said means for circulating the said liquid under pressure so that removal of the said gas is performed without any effect on the circulation of the said liquid. In any event, it is within the competence of the person skilled in the art to design such means of removing the gas delivered to the chamber and possibly of coupling the said removal means to means for recycling the said recovered delivered gas;

a device for controlling the temperature of the liquid into which the $CO_{2_L}$ is injected. The intervention of such a control device is beneficial, for obvious safety reasons. This control device advantageously comprises means for measuring the temperature of the "treated" liquid and means for stopping the injection of the $CO_{2_L}$; the means are to be actuated when the said temperature is below a reference temperature. It will be understood that, in a particularly advantageous manner, the said device also comprises means for automatically controlling the said means for stopping the injection of $CO_{2_L}$ which automatic-control means automatically activate the said stopping means as soon as the measured temperature is below a reference value. With or without the intervention of such automatic-control means (advantageously with) it is strongly recommended that the means of stopping the injection of the $CO_{2_L}$ comprise a so-called safety valve, mounted on the $CO_{2_L}$ supply circuit upstream of the $CO_{2_L}$ injection valve. This then yields a device for controlling the temperature which independently of the regulation provides the installation with positive temperature protection (because the safety valve or shut-off valve is upstream of the injection valve).

The present invention, in both its method and device aspects, is now described with reference to the single appended figure. The said figure diagrammatically depicts a device of the invention which is suited to implementing an advantageous alternative form of the method of the invention.

Liquid carbon dioxide ($CO_{2_L}$) from a source S is injected according to the invention—under the protection of a stream of carbon dioxide gas ($CO_{2_G}$) when injection is stopped—into a liquid effluent L circulated under pressure by means of the pump P in the pipe C. The said injection of $CO_{2_L}$ is at fixed flow rate, and is regulated in stepped mode.

It is implemented slaved to automatic-control means 2, to regulate the pH of the said liquid effluent The means 1 of injecting the said $CO_{2_L}$ into the liquid effluent L mainly consist of an injection valve 1a, of the ball valve type, connected directly to an injection head 1b tapped into the pipe C. The said valve 1a is equipped with an injector i, on the injection head 1b side. The said injection valve 1a operates in all or nothing mode; it is either open or closed. Its opening and its closure are controlled by the actuator 1c, slaved to the automatic-control means 2. The said actuator 1c, located at some distance in a temperate zone, is supplied with gas via the $CO_{2_G}$ supply circuit, to cause it to work.

The said valve 1a is open when the pH of the liquid effluent L is above a preset reference value; it is closed by the actuator 1c when the said pH remains below or equal to the said reference value. The said valve 1a is supplied with $CO_{2_L}$ via the supply circuit 3 connected to the source S.

The injection head 1b tapped into the pipe C makes it possible, alternately, to deliver $CO_{2_L}$ and $CO_{2_G}$ into the liquid effluent L. It comprises:

facing the injector i of the valve 1a, a first inlet of $CO_{2_L}$;

facing the said first inlet, an outlet (into the liquid effluent L), and, arranged at 90° to its axis connecting the said first inlet and the said outlet, a second inlet for the $CO_{2_G}$.

A line 6 for carbon dioxide in the gaseous state ($CO_{2_G}$) permanently supplies this second inlet via, in this order, a serpentine coil 7, a pressure reducer 5, a flow-regulation valve 6a and, finally, a non-return valve 6b. In the context of the alternative form depicted, the protective gas used is therefore carbon dioxide tapped from the liquid carbon dioxide supply circuit 3. The fraction of $CO_{2_L}$ tapped off is heated and vaporized in the said serpentine coil 7, at ambient temperature. It is then expanded by the pressure. reducer 5 before being injected via the flow-regulation valve 6a, the non-return valve 6b and the injection head 1b.

The pipe C is fitted, downstream of the injection head 1b, with means 4, for removing the injected $CO_{2_G}$. The said removal means 4 comprise:

a vent valve 4a, an actuator 4b which brings about the closure of the said valve 4a, via automatic-control means 4c.

The said vent valve 4a is normally open when power is not applied (always open). Thus, in the event of a power failure, it automatically allows the protective $CO_{2_G}$ to escape. It closes, under the action of the actuator 4b, as soon as the pump P for transferring the liquid effluent L starts to operate. By contrast, as soon as the said pump P stops, the said valve 4a opens, thus venting the injected $CO_{2_G}$, thereby preventing the formation of pockets of gas downstream of the injection. This valve 4a therefore makes it possible always to keep a liquid charge downstream of the pump P. The said pump P can therefore restart without the risk of losing its prime.

The device depicted also comprises a unit for monitoring the temperature of the liquid effluent L. This is because if the period during which the $CO_{2_L}$ is injected is abnormally extended (for example in the event of failure of the pH meter, failure of the pH regulator, failure of the injection valve 1a), the temperature of the said liquid effluent L can drop dangerously, until the pipe C ices up with dry ice.

The said temperature-monitoring unit comprises:

a temperature probe 8, measuring the temperature of the said liquid effluent L;

a device for controlling this temperature, which itself comprises automatic-control means 10 and a valve actuator 9b;

a so-called safety valve 9a, operated by the said actuator 9b, arranged on the $CO_{2_L}$ supply circuit 3 and allowing the $CO_{2_L}$ supply to be shut off.

The said valve 9a and its actuator 9b constitute the means 9 of stopping the said $CO_{2_L}$ supply.

This monitoring unit provides positive temperature protection which is independent of the pH regulation because the safety valve 9a (or shut-off valve) is upstream of the injection valve 1a. It will also be noted that the said safety valve 9a is obviously downstream of the point at which the fraction of $CO_{2_L}$ which is intended, in the serpentine coil 7, to generate the $CO_{2_G}$ used for regulation, according to the invention, is tapped.

Between the said safety valve 9a and the injection valve 1a there is a safety valve 11.

It will also be noted that the actuators involved—the actuators 1c, 4b and 9b for actuating the injection valve 1a, the vent valve 4a and the safety valve 9a, respectively,—are pneumatic actuators supplied with gas in the form of $CO_{2_G}$ tapped from the supply circuit 6 of the injection head 1b.

From an examination of the said figure and from the description hereinabove, the person skilled in the art will have fully grasped the benefit of the present invention which proposes an injection of $CO_{2_L}$, at a fixed flow rate in stepped mode under the protection of a stream of $CO_{2_G}$ when injection is stopped. Specifically:

while the $CO_{2_L}$ is being injected into the liquid effluent L, the supply of $CO_{2_G}$ is automatically interrupted by virtue of the pressure differential;

by contrast, as soon as the said injection of $CO_{2_L}$ stops, the supply of $CO_{2_G}$ resumes instantly with a minimal set flow rate, thus thermally insulating the downstream end of the injection zone (which is at about −80° C.) from the liquid effluent L (which itself is at a positive temperature).

The following are advantageously associated with the means necessary for carrying out the said injection of $CO_{2_L}$ under $CO_{2_G}$ protection:

a subassembly for venting the stream of $CO_{2_G}$ gas;

a subassembly for controlling the temperature of the liquid effluent L.

The present invention is finally illustrated via the example below.

An installation of the type of the one depicted in the appended figure is used under the following conditions.

The liquid industrial effluent which is "to be treated" is transferred at varying flow rates (from 30 to 50 m³/h) using a pump at 2.5 bar from an upstream basin to a downstream basin which empties into the drain. However, the said effluent can be discharged into the said drain only if its mean pH is a maximum of 8.

A stainless steel sleeve with a nominal diameter of 125 mm, fitted with an injection valve (ball valve+injector at the valve outlet) and with an injection head, is placed (tapped into the pipe) just after the transfer pump so that the $CO_{2_L}$ injected/treated effluent contact time is as long as possible, between the two basins.

The injection valve is equipped with a 0.9 mm injector which provides a flow rate of 12 g of $CO_{2_L}$ per second.

The flow rate of gas protecting the injection head ($CO_{2_G}$ tapped from the $CO_{2_L}$ supply circuit) has been set to a minimum value of about 3 l/min.

A soon as the pH measurement indicates that the effluent has a pH higher than 8, $CO_{2_L}$ is injected for a period of the order of 6 seconds out of a fixed 8-second cycle. The length of the injection period decreases thereafter until it fades to nothing by virtue of the PID loop (which provides Proportional Integral Derivative regulation).

What is claimed is:

1. Method for the regulated injection of liquid carbon dioxide ($CO_{2_L}$) into a liquid (L) under pressure inside a chamber, which comprises:

injecting the liquid carbon dioxide ($CO_{2_L}$) at a fixed flow rate, in stepped mode, by an injection device comprising an injection valve and an injection head tapped into a wall of the chamber, the injection head being positioned directly at the outlet from the injection valve; and, as soon as each injection of liquid carbon dioxide ($CO_{2_L}$) stops, a gas is delivered into the liquid (L) through the injection head in place of the liquid carbon dioxide ($CO_{2_L}$); the gas being delivered at sufficient pressure to prevent any of the liquid (L) from running back into the injection head.

2. Method according to claim 1, wherein the gas delivered is carbon dioxide; the carbon dioxide being the result of vaporization of a fraction of the liquid carbon dioxide ($CO_{2_L}$) tapped from a liquid carbon dioxide ($CO_{2_L}$) supply circuit upstream of the injection device.

3. Method according to claim 1, wherein the gas delivered into the liquid (L) is at least partially removed and recycled.

4. Method according to claim 1, wherein the liquid carbon dioxide ($CO_{2_L}$) is injected at an upstream pressure of between about $14 \times 10^5$ and $20 \times 10^5$ Pa (14 to 20 bar) and at an upstream temperature of between −20° C. and −30° C.

5. Method according to claim 1, wherein the temperature of the liquid (L) is controlled; the injection of liquid carbon dioxide ($CO_{2_L}$) being stopped as soon as the temperature of the liquid (L) is below a reference temperature.

6. Method according to claim 1, further comprising regulated injection, in stepped mode, of liquid carbon dioxide ($CO_{2_L}$) into a liquid (L) circulating under pressure through a pipe; the gas delivered into the liquid (L), as soon as each injection of liquid carbon dioxide ($CO_{2_L}$) stops, being at least partially removed when the circulation of the liquid (L) stops.

7. Method according to claim 1, wherein the liquid carbon dioxide ($CO_{2_L}$) is injected for descaling purposes and/or for preventing build-up of scale.

8. Method according to claim 2, wherein the gas delivered into the liquid (L) is at least partially removed and recycled.

9. Method according to claim 2, wherein the liquid carbon dioxide ($CO_{2_L}$) is injected at an upstream pressure of between about $14 \times 10^5$ and $20 \times 10^5$ Pa (14 to 20 bar) and at an upstream temperature of between $-20°$ C. and $-30°$ C.

10. Method according to claim 3, wherein the liquid carbon dioxide ($CO_{2_L}$) is injected at an upstream pressure of between about $14 \times 10^5$ and $20 \times 10^5$ Pa (14 to 20 bar) and at an upstream temperature of between $-20°$ C. and $-30°$ C.

11. Method according to claim 2, wherein the temperature of the liquid (L) is controlled; the injection of liquid carbon dioxide ($CO_{2_L}$) being stopped as soon as the temperature of the liquid (L) is below a reference temperature.

12. Method according to claim 3, wherein the temperature of the liquid (L) is controlled; the injection of liquid carbon dioxide ($CO_{2_L}$) being stopped as soon as the temperature of the liquid (L) is below a reference temperature.

13. Method according to claim 4, wherein the temperature of the liquid (L) is controlled; the injection of liquid carbon dioxide ($CO_{2_L}$) being stopped as soon as the temperature of the liquid (L) is below a reference temperature.

14. Method according to claim 2, further comprising regulated injection, in stepped mode, of liquid carbon dioxide ($CO_{2_L}$) into a liquid (L) circulating under pressure through a pipe; the gas delivered into the liquid (L), as soon as each injection of liquid carbon dioxide ($CO_{2_L}$) stops, being at least partially removed when the circulation of the liquid (L) stops.

15. Method according to claim 3, further comprising regulated injection, in stepped mode, of liquid carbon dioxide ($CO_{2_L}$) into a liquid (L) circulating under pressure through a pipe; the gas delivered into the liquid (L), as soon as each injection of liquid carbon dioxide ($CO_{2_L}$) stops, being at least partially removed when the circulation of the liquid (L) stops.

16. Method according to claim 4, further comprising regulated injection, in stepped mode, of liquid carbon dioxide ($CO_{2_L}$) into a liquid (L) circulating under pressure through a pipe; the gas delivered into the liquid (L), as soon as each injection of liquid carbon dioxide ($CO_{2_L}$) stops, being at least partially removed when the circulation of the liquid (L) stops.

17. Method according to claim 2, wherein the liquid carbon dioxide ($CO_{2_L}$) is injected for descaling purposes and/or for preventing build-up of scale.

18. Method according to claim 3, wherein the liquid carbon dioxide ($CO_{2_L}$) is injected for descaling purposes and/or for preventing build-up of scale.

19. Method according to claim 4, wherein the liquid carbon dioxide ($CO_{2_L}$) is injected for descaling purposes and/or for preventing build-up of scale.

* * * * *